US010758926B2

(12) United States Patent
Orla-Jensen et al.

(10) Patent No.: US 10,758,926 B2
(45) Date of Patent: Sep. 1, 2020

(54) METHOD AND SYSTEM FOR CONTROLLING A FLUID PATTERN OF A DISPENSED FLUID (71) Applicant: NORDSON CORPORATION, Westlake, OH (US)

(72) Inventors: Per Orla-Jensen, Vista, CA (US); Timothy Girvin, San Diego, CA (US); Gareth De Sanctis, Encinitas, CA (US); Kenneth S. Espenschied, Olmsted Township, OH (US); Patrick T. Hogan, San Marcos, CA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/768,006

(22) PCT Filed: Nov. 3, 2016

(86) PCT No.: PCT/US2016/060223
§ 371 (c)(1),
(2) Date: Apr. 12, 2018

(87) PCT Pub. No.: WO2017/079366
PCT Pub. Date: May 11, 2017

(65) Prior Publication Data
US 2018/0304293 A1   Oct. 25, 2018

Related U.S. Application Data (60) Provisional application No. 62/250,704, filed on Nov. 4, 2015.

(51) Int. Cl.
*G01N 21/88* (2006.01)
*B05B 12/08* (2006.01)
(Continued)

(52) U.S. Cl.
CPC .......... *B05B 12/082* (2013.01); *B05B 12/084* (2013.01); *G01N 15/0227* (2013.01);
(Continued)

(58) Field of Classification Search
CPC ..... B05B 12/082; B05B 12/084; B05B 12/16; B05B 12/00; B05B 12/004; B05B 1/02;
(Continued)

(56) References Cited

U.S. PATENT DOCUMENTS 4,712,736 A * 12/1987 Bray ................. G01F 1/64
239/11
5,312,039 A * 5/1994 Sayka ............... B05B 12/082
118/688

(Continued)

FOREIGN PATENT DOCUMENTS

EP     2 674 225 A2   12/2013
EP     3 047 912 A1   7/2016
(Continued)

OTHER PUBLICATIONS

International Patent Application No. PCT/US2016/060223; Int'l Preliminary Report on Patentability; dated May 17, 2018; 10 pages.

*Primary Examiner* — Hoa Q Pham
(74) *Attorney, Agent, or Firm* — Baker & Hostetler LLP (57) ABSTRACT A fluid dispensing system and a method of controlling a fluid dispensing system are disclosed. The fluid dispensing system includes a source of a fluid, a dispensing nozzle, and a spray system. The spray system supplies fluid from the source of fluid to the dispensing nozzle using system parameters for the spray system. The spray system and dispensing nozzle are configured to dispense the fluid as a stream or spray as an actual fluid pattern according to one or more first system parameters that are intended to produce a first fluid pattern. A camera is configured to capture one or more images of the actual fluid pattern dispensed from the dispensing nozzle. A controller is operatively connected to the spray system and the camera.

26 Claims, 5 Drawing Sheets (51) Int. Cl.
*G01N 15/02* (2006.01)
*G01N 21/49* (2006.01)
*G01N 21/21* (2006.01)

(52) U.S. Cl.
CPC ......... *G01N 21/49* (2013.01); *G01N 21/8806* (2013.01); *G01N 15/0211* (2013.01); *G01N 21/211* (2013.01)

(58) Field of Classification Search
CPC ............ G01N 21/8806; G01N 21/211; G01N 15/0227; G01N 21/49; G01B 21/20; G01J 5/0037; B41J 2/14
USPC ..... 356/601–623, 335–343, 246; 239/72, 71, 239/67, 68, 69, 73, 8; 382/1, 48, 148
See application file for complete search history.

(56) References Cited

U.S. PATENT DOCUMENTS

| | | | | |
|---|---|---|---|---|
| 6,457,655 | B1 * | 10/2002 | Reighard | B05B 1/04 239/8 |
| 7,188,781 | B2 * | 3/2007 | Reighard | B05B 12/004 239/71 |
| 8,154,711 | B1 | 4/2012 | Scheer | |
| 9,824,438 | B2 * | 11/2017 | Reichhardt | G06K 9/209 |
| 9,868,254 | B2 * | 1/2018 | Stahl | B33Y 40/00 |
| 10,195,665 | B2 * | 2/2019 | Sachs | B33Y 10/00 |
| 10,639,718 | B2 * | 5/2020 | Sachs | B22F 3/008 |
| 2002/0190203 | A1 * | 12/2002 | Valaskovic | H01J 49/165 250/288 |
| 2005/0066903 | A1 * | 3/2005 | Van Den Berg | A01J 5/0175 119/14.08 |
| 2005/0115500 | A1 | 6/2005 | Vardelle et al. | |
| 2007/0026133 | A1 * | 2/2007 | Levin | B05B 12/126 427/9 |
| 2008/0004846 | A1 * | 1/2008 | Onozuka | G06F 30/20 703/9 |
| 2011/0058167 | A1 * | 3/2011 | Knox | G01N 15/06 356/338 |
| 2013/0330466 | A1 * | 12/2013 | Lochner | B05B 12/082 427/8 |
| 2016/0216108 | A1 * | 7/2016 | Bettinelli | B05B 1/02 |
| 2017/0028646 | A1 * | 2/2017 | Sun | B33Y 50/02 |
| 2017/0259289 | A1 | 9/2017 | Schoen et al. | |

FOREIGN PATENT DOCUMENTS

| | | |
|---|---|---|
| WO | 2009/062256 A1 | 5/2009 |
| WO | 2013/061248 A1 | 5/2013 |
| WO | 2017/186678 A1 | 11/2017 |

* cited by examiner

METHOD AND SYSTEM FOR CONTROLLING A FLUID PATTERN OF A DISPENSED FLUID

CROSS-REFERENCE TO RELATED APPLICATIONS

This application is a National Stage of International Patent App No. PCT/US2016/060223, filed Nov. 3, 2016, which claims the benefit of U.S. Provisional App. No. 62/250,704, filed Nov. 4, 2015, the disclosures of which are hereby incorporated by reference in their entirety.

TECHNICAL FIELD

This disclosure generally relates to a fluid dispensing system and method for controlling a fluid dispensing system, and more particularly to a fluid dispensing system that can dispense fluid according to two or more patterns and a method for controlling a fluid pattern dispensed by a fluid dispensing system.

BACKGROUND

Various fluid dispensing systems have been developed to dispense a fluid from a dispensing nozzle toward a surface of a substrate. The fluid may be dispensed in an atomized form or in an un-atomized form as a stream or in beads depending on the intended application. Further, the shape of the fluid pattern may also vary, which may be due to the shape of the nozzle or control settings of the fluid dispensing system. For example, in conformal coating applications, fluid dispensing systems have been designed to dispense a flat, fan-like spray pattern of conformal coating material onto the surface of a substrate, such as a printed circuit board.

During the dispensing process, it is important to ensure that the fluid is dispensed within predetermined process limits of the fluid dispensing system. For example, in conformal coating applications, it may be important that the tracks or bands of coating converge along their adjacent edges or even slightly overlap, to ensure that a full surface coating is provided on the circuit board. To accomplish this, it may be necessary to determine the fluid pattern of the fluid as it is dispensed from the nozzle of the dispensing system. However, known methods are unable to accurately distinguish edges of a fluid pattern.

Accordingly, there is a need for an improved fluid dispensing system and method to address the aforementioned problems and/or other problems known in the art.

SUMMARY

According to an aspect of the present disclosure, a fluid dispensing system includes a source of a fluid and a dispensing nozzle. The fluid dispensing system also includes a spray system for supplying fluid from the source of the fluid to the dispensing nozzle using system parameters for the spray system. The spray system and dispensing nozzle are configured to dispense the fluid, in the form of a stream or spray, as an actual fluid pattern according to one or more first system parameters that are intended to produce a first fluid pattern. A camera is configured to capture one or more images of a first actual fluid pattern dispensed from the dispensing nozzle. A controller is operatively connected to the spray system and camera. The controller is configured to forward instructions to the spray system to dispense the fluid according to the one or more first system parameters to produce the first actual fluid pattern, receive one or more images of the first actual fluid pattern from the camera, determine, based on the one or more images, first actual fluid pattern information of the actual fluid pattern, compare the first actual fluid pattern information to first fluid pattern information for the first fluid pattern, determine, based on the comparison of the first actual fluid pattern information to the first fluid pattern information, that the first actual fluid pattern is outside tolerances set for the first fluid pattern, and forward, based on the determination that the actual fluid pattern is outside tolerances set for the first fluid pattern, one or more second system parameters to the spray system to produce a second actual fluid pattern.

In some aspects, the fluid dispensing system may include a first light source operatively coupled to the controller. The first light source may be configured to emit light through the first actual fluid pattern. In further aspects, the dispensing nozzle, the camera, and the first light source may be each vertically positioned at different vertical positions and the horizontal position of the dispensing nozzle may be between the horizontal position of the camera and the horizontal position of the first light source. In other aspects, the fluid dispensing system may include a first light source operatively coupled to the controller. The camera and the first actual fluid pattern may be located along a first axis, and the first light source and the first actual fluid pattern may be located along a second axis that intersects with the first axis at the first actual fluid pattern. The first axis may be perpendicular to the second axis. In still other aspects, the first light source may include a planar laser.

In further aspects, the first actual fluid pattern may be located between the camera and the first light source. The fluid dispensing system may include a first polarization filter having a first polarization direction positioned between the first actual fluid pattern and the first light source. The fluid dispensing system may also include a second polarization filter having a second polarization orthogonal to the first polarization direction positioned between the first actual fluid pattern and the camera.

In further aspects, a first light source and a second light source may be operatively coupled to the controller. The first light source and the second light source may be configured to emit light through the first actual fluid pattern. The first actual fluid pattern, the camera, and the first light source may be located along a first axis. The first actual fluid pattern and the second light source may be located along a second axis that intersects with the first axis at the first actual fluid pattern. In some aspects, the first axis may be perpendicular to the second axis. In other aspects, the first light source may emit light at a first wavelength and the second light source may emit light at a second wavelength that is different than the first wavelength.

In another aspect, the first actual fluid pattern information may include at least one of a width of the first actual fluid pattern, a shape of the first actual fluid pattern, an offset of the first actual fluid pattern, a density of the first actual fluid pattern, a quality of the first actual fluid pattern, a size of droplets of the first actual fluid pattern, and a rotational orientation of the first actual fluid pattern. In another aspect, the tolerances set for the first fluid pattern may include at least one of a desired width of the first fluid pattern, a desired shape of the first fluid pattern, a permissible offset of the first fluid pattern, a desired density of the first fluid pattern, a desired quality of the first fluid pattern, a desired size of droplets of the first fluid pattern, and a desired rotational orientation of the first fluid pattern.

In yet another aspect, the one or more second system parameters may include at least one of a fluid pressure of the fluid, a volume of the fluid, a velocity of the fluid, a horizontal position of the dispensing nozzle, a vertical position of the dispensing nozzle, a rotational orientation of the dispensing nozzle, a timing between pulses of the dispensing nozzle, and a pulse duration of the dispensing nozzle. In another aspect, the dispensing nozzle may be further configured to move in at least one horizontal direction and the one or more second system parameters may comprise a horizontal velocity of the dispensing nozzle.

In another aspect, the one or more images of the first actual fluid pattern may comprise at least one image of the first actual fluid pattern from a first angle and at least one image of the first actual fluid pattern from a second angle different than the first angle. The controller may be further configured to determine a three-dimensional model of the first actual fluid pattern based on the at least one image of the first actual fluid pattern from the first angle and the at least one image of the first actual fluid pattern from the second angle. The first actual fluid pattern information may be determined further based on the three-dimensional model of the first actual fluid pattern. In another aspect, the camera may be configured to move between a first position to capture the at least one image of the first actual fluid pattern from the first angle and a second position to capture the at least one image of the first actual fluid pattern from the second angle.

In a further aspect, the fluid dispensing system may further comprise a second camera operatively connected to the controller. The one or more images of the first actual fluid pattern from the camera may be from a first angle with respect to the first actual fluid pattern. The second camera may be configured to capture a second set of one or more images of the first actual fluid pattern from a second angle with respect to the first actual fluid pattern, with the second angle being different than the first angle. The controller may be further configured to receive the second set of one or more images of the first actual fluid pattern from the second camera and determine a three-dimensional model of the first actual fluid pattern based on the one or more images of the first actual fluid pattern from the camera and the second set of one or more images of the first actual fluid pattern from the second camera. The first actual fluid pattern information may be determined further based on the three-dimensional model of the first actual fluid pattern.

In another aspect, a method for controlling a fluid dispensing system includes forwarding instructions to a spray system of the fluid dispensing system to dispense the fluid through a dispensing nozzle according to one or more first system parameters intended to produce a first fluid pattern, receiving one or more images of a first actual fluid pattern dispensed by the dispensing nozzle from a camera, determining, based on the one or more images, first actual fluid pattern information of the first actual fluid pattern, comparing the first actual fluid pattern information to first fluid pattern information for the first fluid pattern, determining, based on the comparison of the first actual fluid pattern information to the first fluid pattern information, that the first actual fluid pattern is outside tolerances set for the first fluid pattern, and forwarding, based on the determination that the first actual fluid pattern is outside tolerances set for the first fluid pattern, one or more second system parameters to the spray system to produce a second actual fluid pattern. In further aspects, the method may include causing a light source to emit light through the first actual fluid pattern.

In some aspects, the first actual fluid pattern information may be at least one of a width of the first actual fluid pattern, a shape of the first actual fluid pattern, an offset of the first actual fluid pattern, a density of the first actual fluid pattern, a quality of the first actual fluid pattern, a size of droplets of the first actual fluid pattern, and a rotational orientation of the first actual fluid pattern. The tolerances set for the first fluid pattern may be at least one of a desired width of the first fluid pattern, a desired shape of the first fluid pattern, a permissible offset of the first fluid pattern, a desired density of the first fluid pattern, a desired quality of the first fluid pattern, a desired size of droplets of the first fluid pattern, and a desired rotational orientation of the first fluid pattern. The one or more second system parameters comprise at least one of, a fluid pressure of the fluid, a volume of the fluid, a velocity of the fluid, a horizontal position of the dispensing nozzle, a vertical position of the dispensing nozzle, a rotational orientation of the dispensing nozzle, a timing between pulses of the dispensing nozzle, and a pulse duration of the dispensing nozzle. In further aspects, the dispensing nozzle may be further configured to move in at least one horizontal direction, and the system parameters may comprise a horizontal velocity of the dispensing nozzle.

In another aspect, the method may further comprise maintaining a model of the first actual fluid pattern based on at least the one or more images. In another aspect, the method may further comprise causing a light source to emit light through the first actual fluid pattern.

In yet another aspect, the one or more images of a first actual fluid pattern may comprise at least one image of the first actual fluid pattern from a first angle and at least one image of the first actual fluid pattern from a second angle different than the first angle. The method may further comprise determining a three-dimensional model of the first actual fluid pattern based on the at least one image of the first actual fluid pattern from the first angle and the at least one image of the first actual fluid pattern from the second angle. The first actual fluid pattern information may be determined further based on the three-dimensional model of the first actual fluid pattern.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

Figure 1:
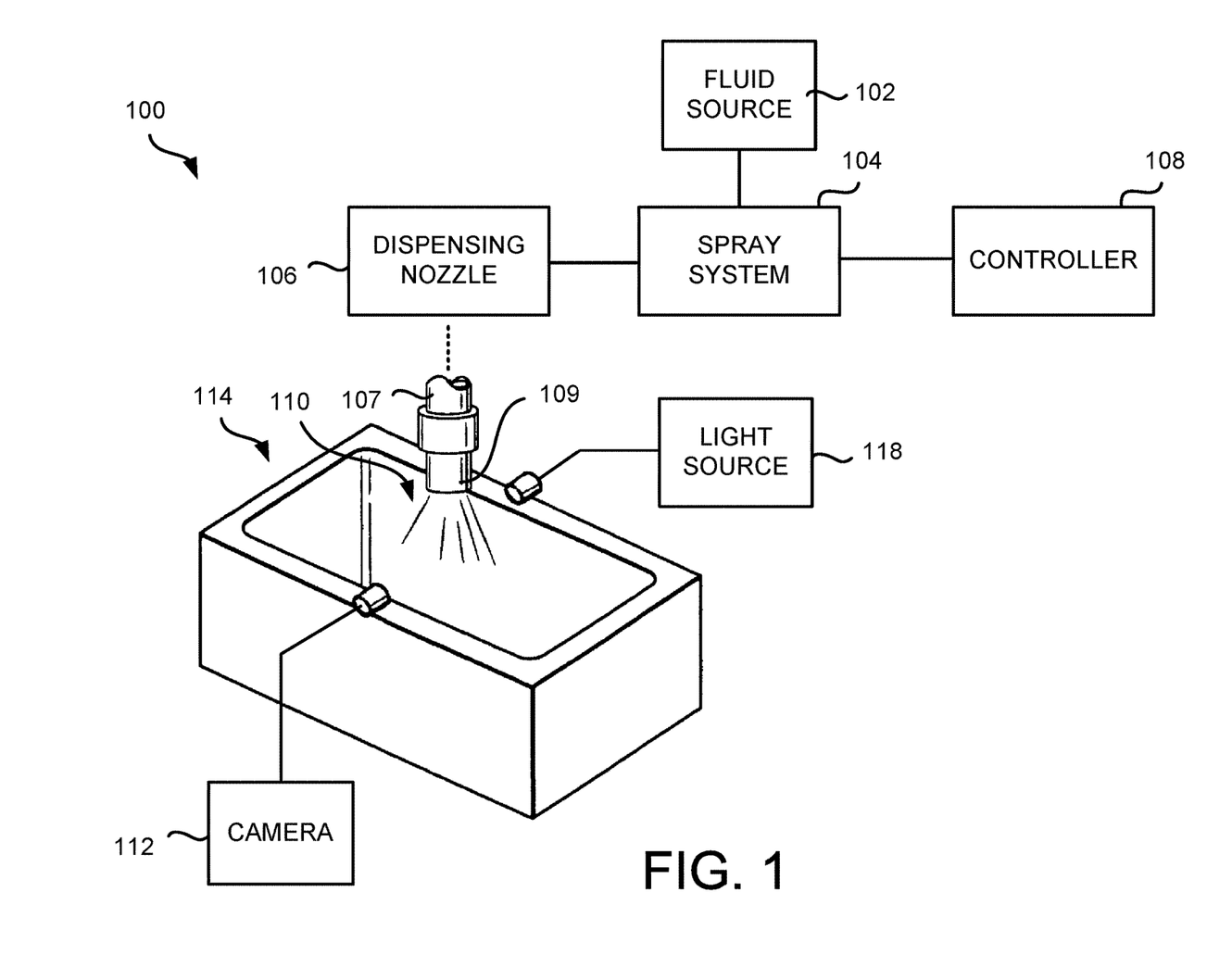
FIG. 1 is a partial schematic diagram view of a fluid dispensing system according to an aspect of the disclosure.

FIG. 1 illustrates a fluid dispensing system 100. The fluid dispensing system 100 includes a fluid source 102 that is operatively coupled to a spray system 104. The spray system 104 may supply fluid from the fluid source 102 to a dispensing nozzle 106. The spray system 104 may control the flow of the fluid out of a dispensing nozzle 106 onto a substrate (not shown) below the dispensing nozzle 106 using system parameters for the spray system 104. The spray system 104 may be operatively coupled to and controlled by a controller 108. The spray system 104 may include a pneumatic regulator and may control the fluid pressure of the fluid within a dispensing barrel 107 and/or end 109 of the dispensing nozzle 106.

The fluid dispensing system 100 may be configured for "spot" applications where the fluid is dispensed while the fluid dispenser is not moving or for "coating" applications where the fluid is dispensed while the dispensing nozzle 106 and/or substrate receiving the fluid is moving. The fluid may include any number of fluids, such as adhesives, paints, sealants, conformal coatings, conductive or insulating coatings, and the like. The fluid may be dispensed from the dispensing nozzle 106 in a predetermined fluid pattern 110. The fluid pattern 110 may be in an atomized form such as in a spray, or in a non-atomized form such as in drops, in beads, in streams, or in another form. The fluid pattern 110 may have different shapes and/or cross-sections, such as a ribbon, a band, a spiral, a web, and the like. The fluid pattern 110 may be a flat fan-like pattern or, alternatively, the fluid pattern 110 may have an oval, circular, rectangular, square, or other cross-sectional shape as taken in a plane generally parallel to the substrate.

The shape, size, orientation, and/or form of the fluid pattern 110 may depend on the opening shape of the dispensing nozzle 106 as well as various system parameters of the dispensing nozzle 106, the spray system 104, and/or the fluid dispensing system 100 in general. For example, such system parameters may include the pressure, velocity, and/or volume of fluid at which the fluid is dispensed or provided to the dispensing nozzle 106. Other such system parameters may include the vertical and/or horizontal positioning of the dispensing nozzle 106 with respect to the substrate, as well as the rotational orientation of the dispensing nozzle 106. (As used throughout the present disclosure, and unless otherwise indicated explicitly or by context, the term "horizontal" and the like refers to a direction, plane, orientation, etc. generally parallel to the substrate and the term "vertical" and the like refers to a direction, plane, orientation, etc. generally perpendicular to the substrate.) In some aspects, the dispensing nozzle 106 may be moved (e.g. horizontally) relative to the substrate and/or the substrate may be moved relative to the dispensing nozzle 106. Accordingly, the system parameters may include a horizontal movement direction and/or a horizontal velocity of the dispensing nozzle and/or substrate. In yet other aspects, the fluid may be dispensed from the dispensing nozzle 106 in a series of timed pulses. As such, the aforementioned system parameters may include a time between pulses and/or a duration of each pulse.

The fluid dispensing system 100 includes a camera 112 operatively coupled to the controller 108. The camera 112 may be configured to capture images of the fluid pattern 110 of the fluid as it is dispensed from the dispensing nozzle 106. The images captured by the camera 112 may be still images or images that comprise a video stream. The camera 112 may forward the images of the fluid pattern 110 to the controller 108, which may use the images to perform other processing steps, such as described with reference to FIG. 5 below. The camera 112 may include any lens and imaging sensors to capture the images, such as a charge-coupled device (CCD), a complementary metal-oxide-semiconductor (CMOS) sensor, an N-type metal-oxide-semiconductor (NMOS) sensor, or other type of sensor known in the art.

The camera 112 may capture images of the fluid pattern 110 within infrared wavelengths, visible wavelengths, and/or ultraviolet wavelengths of the electromagnetic spectrum. In some aspects, the fluid may contain a material that fluoresces within ultraviolet wavelengths of the electromagnetic spectrum, and the camera 112 may be configured to capture images within the ultraviolet wavelengths of the electromagnetic spectrum. In some aspects, the camera 112 may include a filter to reduce noise in the captured images.

In some aspects, the fluid dispensing system 100 may include a drain pan 114 located below the dispensing nozzle 106. The drain pan 114 may include a recessed chamber or well for receiving and draining fluid dispensed by the dispensing nozzle 106. The drain pan 114 may be mounted onto a line conveyor (not shown) or another location within the work area. The drain pan 114 may also be fluidly coupled to a fluid reservoir (not shown).

In some aspects, the fluid dispensing system 100 may include at least one light source 118. The light source 118 may be operatively coupled to the controller 108 and configured to emit light through the fluid pattern 110. The light source 118 may be located directly in front of the camera 112 on the other side of the dispensing nozzle 106 and on the same horizontal plane as the camera 112. In other aspects, the light source 118 may be located offset from the camera 112 and on a different horizontal and/or vertical plane as the camera 112. For example, the light source 118 and the camera 112 may each be vertically positioned at different vertical positions. An offset may prevent overexposure of images captured by the camera 112. Despite the light source 118 and the camera 112 being vertically offset from each other in some aspects, the light source 118 and the camera 112 may still be in horizontal alignment with one another and the dispensing nozzle 106 and/or the fluid pattern 110. For example, the horizontal position of the dispensing nozzle 106 and/or fluid pattern 110 may be between the horizontal position of the camera 112 and the horizontal position of the light source 118.

The light source 118 may be a light-emitting diode (LED), an incandescent lamp, a fluorescent lamp, an electrical gas-discharge lamp, a laser, or any other type of light source known in the art. The light source 118 may emit white light, or light within a particular wavelength band, such as blue, red, or green light. The light source 118 may also emit electromagnetic radiation within the infrared and/or ultraviolet wavelength bands.

The light source 118 may provide illumination of the fluid pattern 110 to improve image quality of the images captured by the camera 112. Additional modifications to the light source 118 are contemplated to improve the quality of images captured by the camera 112. Some of these modifications are described with reference to FIGS. 2-4.

In some aspects, the fluid dispensing system 100 may be configured to capture images of the fluid pattern 110 from more than one angle with respect to the fluid pattern 110. For example, one or more images (or video stream(s)) of the fluid pattern 110 may be captured from a first angle and one or more images (or video stream(s)) of the fluid pattern 110 may be captured from a different, second angle.

To this end, the fluid dispensing system 100 may be configured with two or more cameras 112 situated to capture images of the fluid pattern 110 from different angles. A light source 118 may be provided for each of the two or more cameras 112. Each light source 118 may be positioned opposite the fluid pattern 110 and along an axis extending through fluid pattern 110 and the respective camera 112, in a similar manner as that shown with the single camera 112 and light source 118 depicted in FIG. 1. The timing at which the multiple cameras 112 each capture their respective image(s) of the fluid pattern 110, as well as the timing at which the corresponding light source 118 illuminates the fluid pattern 110, may be synchronized such that the image(s) or video(s) at the different angles are captured in discrete sequence. For example, a first camera 112 may capture a first image of the fluid pattern 110 at a first time, while a first light source 118 also illuminates the fluid pattern 110 at the first time. A second camera 112 may then capture a second image of the fluid pattern 110 at a second time, while a second light source 118 also illuminates the fluid pattern 110 at the second time.

Additionally or alternatively, the camera 112 may be configured to move between multiple discrete positions and capture images of the fluid pattern 110 at each of those multiple discrete positions. For example, the camera 112 may be configured to horizontally rotate, partially or fully, around the fluid pattern 110. The camera 112 may capture images of the fluid pattern 110 at two or more of the discrete positions in the rotation. In one aspect, the camera 112 may capture a video stream as the camera 112 rotates about the fluid pattern 110. The light source 118 may additionally be configured to rotate around the fluid pattern 110 in conjunction with the rotation of the camera 112 to provide consistent illumination of the fluid pattern 110.

As will be discussed in greater detail with reference to the processing steps described in relation to FIG. 5, the images or video(s) of the fluid pattern 110 taken from different angles may be used to create a three-dimensional model of the fluid pattern 110. The three-dimensional model of the fluid pattern may be used to determine various characteristics of the dispensed fluid pattern 110, which may be used in a comparison with desired characteristics to determine if and how one or more system parameters of the fluid dispensing system 100 should be adjusted.

Figure 2:
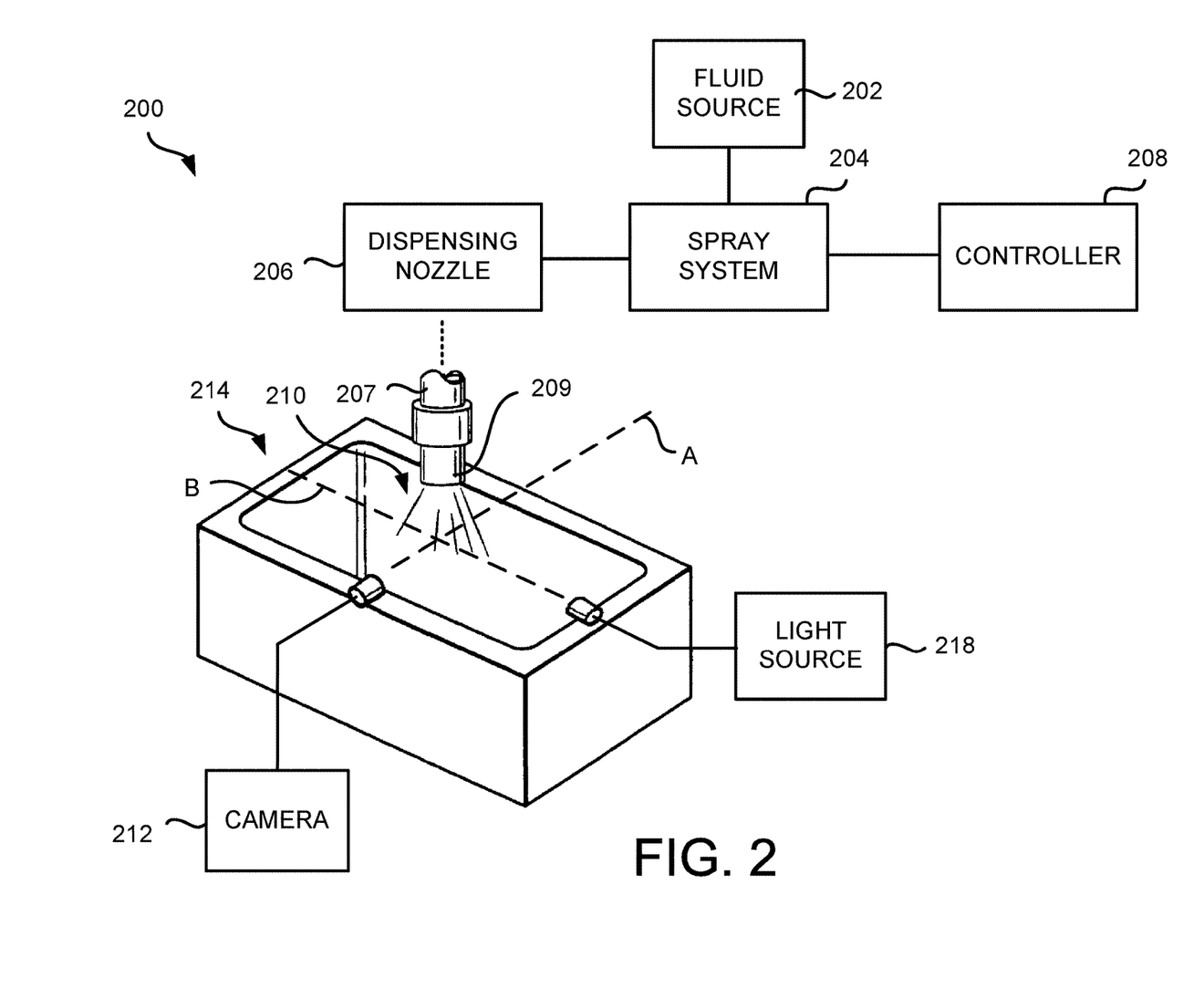
FIG. 2 is a partial schematic diagram of a fluid dispensing system according to another aspect of the disclosure.

FIG. 2 illustrates a fluid dispensing system 200 according to another aspect. The fluid dispensing system 200 may include a fluid source 202, a spray system 204, a dispensing nozzle 206 with a dispensing barrel 207 and end 209, a controller 208, a camera 212, a drain pan 216, and a light source 218 similar to those described above with respect to the fluid dispensing system 100 of FIG. 1.

In the aspect described in FIG. 2, the camera 212 may be oriented along a first axis A. The dispensing nozzle 206 may be correspondingly positioned with respect to the camera 212 such that a fluid pattern 210 created by the dispensing nozzle 206 is also aligned along the first axis A. However, the light source 218 may be oriented along a second axis B, along which the fluid pattern 210 created by the dispensing nozzle 206 is also aligned. Thus, the second axis B may intersect with the first axis A at the position corresponding to the dispensing nozzle 206 (i.e., at the fluid pattern 210). For example, as shown in FIG. 2, the first axis A may be perpendicular to the second axis B. Alternatively, in some aspects, the first axis A may be oblique to the second axis B.

The light source 218 may include a planar laser. The planar laser may emit a plane of light, rather than a single beam of light. The emission of a plane of light may allow selective illumination of a horizontal or vertical cross section of the fluid pattern 210. For example, the planar laser may be used to illuminate a plane perpendicular to the first axis A or at an oblique angle to the first axis A. For example, the fluid pattern 210 may be dispensed as a hemispherical, semi-ellipsoid, semi-ovoid, fan, or other shape. Accordingly, the planar laser may illuminate a cross section of the fluid pattern 210 with the cross section having a semicircle, semi-elliptical, semi-ovular, triangular, rectangular, or other shape.

The planar laser may be configured to emit a continuous beam or pulse beam. A pulse timing may provide higher peak power for a given energy consumption and allow for improved temporal resolution of the fluid pattern. Types of lasers that may be selected for the planar laser include a neodymium-doped yttrium aluminium garnet (Nd:YAG) laser, a dye laser, an excimer laser, an ion laser, and other lasers known in the art. In some aspects, the camera 212 may include a filter to reduce noise in the captured images.

In some aspects, the planar laser may be used to align the position and/or rotational orientation of the dispensing nozzle 206. The dispensing nozzle 206 may be configured to move in any direction across the plane defined by the first axis A and the second axis B. The dispensing nozzle 206 may be further configured to move up and down (i.e., vertically) in a direction perpendicular to the plane defined by the first axis A and the second axis B. The dispensing nozzle 206 may yet further be configured to rotate about a longitudinal axis of the dispensing nozzle 206. For example, the dispensing nozzle 206 may be configured to rotate about a longitudinal axis of the dispensing barrel 207.

Based on the width and/or shape of the cross-section illuminated by the planar laser and captured by the camera 212, the controller 208 may determine whether the dispensing nozzle 206 is horizontally or vertically offset from an intended location without the need for additional sensors. For example, the dispensing nozzle 206 may be configured to dispense the fluid in a hemispherical or hemi-ellipsoid shape. A cross-section of the fluid pattern 201 may have a maximum width directly below the dispensing nozzle 206. To align the dispensing nozzle 206, the dispensing nozzle 206 may move laterally along the first axis A until the illuminated cross-section has a maximum width.

As another example, based on the width and/or shape of the cross-section illuminated by the planar laser and captured by the camera, the controller 208 may determine whether the dispensing nozzle 206 is rotationally oriented at an intended orientation. As one example, the dispensing nozzle 206 may produce the fluid pattern 210 in a fan shape having one thin horizontal dimension and one elongate horizontal dimension, with the elongate dimension being greater than the thin dimension. The elongate horizontal dimension of the fan-shaped fluid pattern 210 may be intended to be parallel with the first axis A and the thin horizontal dimension of the fan-shaped fluid pattern 210 may be intended to be perpendicular to the first axis A. Thus, the camera 212 may capture an image of the fluid pattern 210 that, if the dispensing nozzle 206 is rotationally oriented as intended, will depict a cross section with a width equal that of the thin dimension of the fluid pattern 210. Yet, if the width of the cross section captured by the camera 212 is greater than the thin dimension of the fluid pattern 210, the rotational orientation of the fluid pattern 210, and thus also the dispensing nozzle 206, may not be rotationally oriented as required. The rotational orientation of the dispensing nozzle 206 may accordingly be adjusted until the width of the cross-section captured by the camera 212 matches that of the thin dimension of the fan-shaped fluid pattern 210.

Similarly, a fan-shaped fluid pattern 210 may instead be positioned such that the elongate dimension of the fan-shaped fluid pattern 210 is required to be perpendicular to the first axis A and the thin dimension of the fan-shaped fluid pattern 210 is required to be parallel to the first axis A. In this case, the width of the cross-section captured by the camera 212 would be less than the elongate dimension of the fan-shaped fluid pattern 210 if the dispensing nozzle 206 is not rotationally oriented as required. The rotational orientation of the dispensing nozzle 206 may be adjusted until the width of the cross-section captured by the camera 212 equals the elongate dimension of the fan-shaped fluid pattern 210.

In further aspects, the fluid dispenser may include additional planar lasers that emit vertical planes of light parallel to each other and perpendicular or oblique to the first axis A. The multiple planar lasers may allow selective illumination of different cross sections of the fluid pattern 210. For example, the dispensing nozzle 206 may be configured to dispense the fluid in a hemispherical or hemi-ellipsoid shape. A first planar laser may illuminate a cross section of the fluid pattern 210 directly below the dispensing nozzle 206 while a second planar laser may illuminate a cross section of the fluid pattern 210 a fixed distance away from the dispensing nozzle 206. These additional planar lasers may be used by the controller 208 to determine a 3-D profile of the fluid pattern 210. To distinguish between the illuminated cross-sections, each planar laser may be configured to emit light at a different frequency of the light spectrum. In another aspect, each planar laser may be pulsed in an alternating manner such that only one planar laser is emitting at a time. The controller 208 may be synchronized with the pulse timing of the planar lasers to allow the controller 208 to determine which cross-section of the fluid pattern 210 has been illuminated.

In another aspect, the planar laser may be configured to emit a horizontal plane of light parallel to the substrate. The planar laser may illuminate a horizontal cross-section of the fluid pattern 210. The fluid dispensing system 200 may include an additional camera 212 configured to capture an image of the horizontal cross-section, which may provide additional information to the controller 208 to control the fluid pattern 210.

Figure 3:
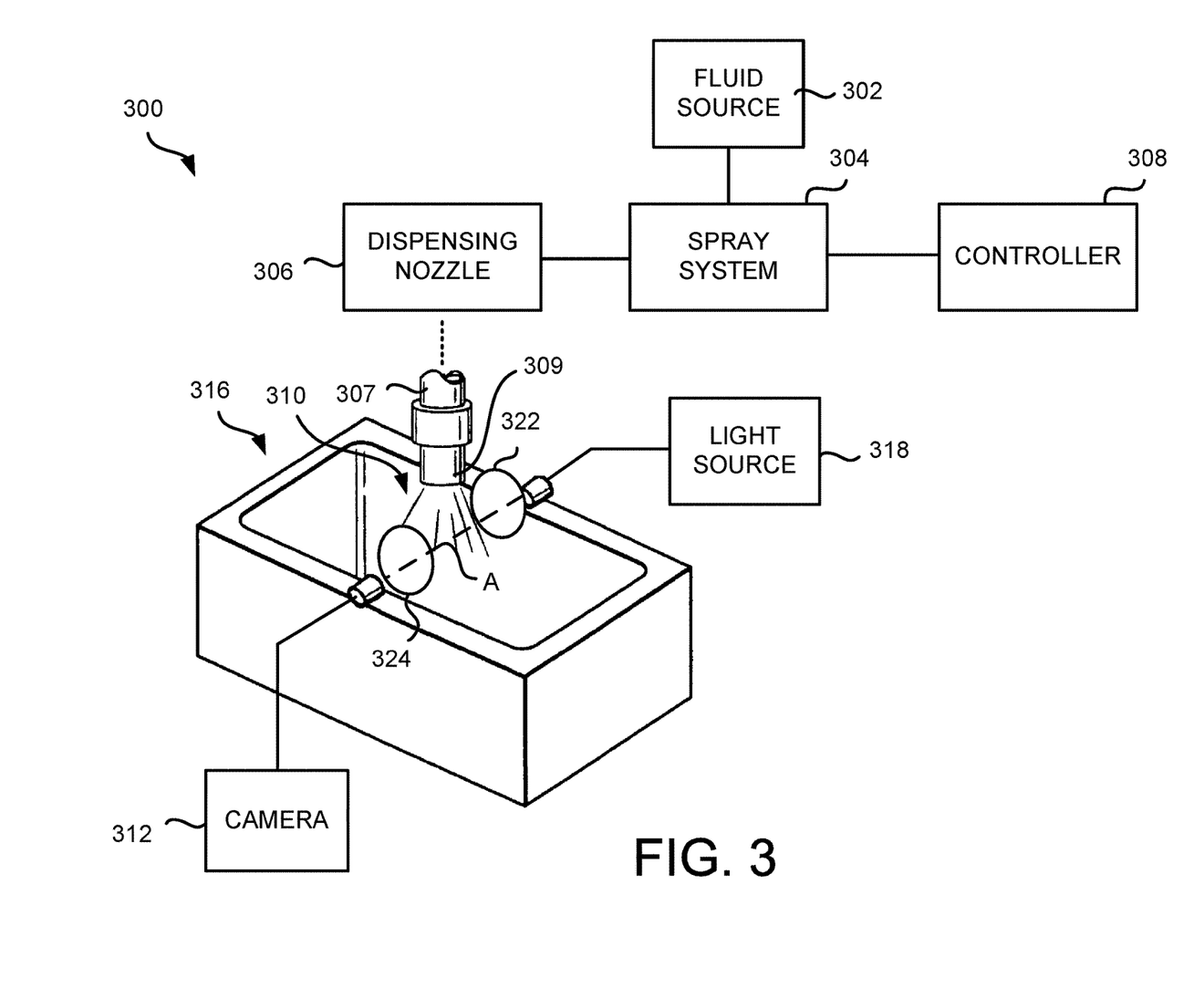
FIG. 3 is a partial schematic diagram of a fluid dispensing system according to a further aspect of the disclosure.

FIG. 3 illustrates a fluid dispensing system 300 according to yet another aspect. The fluid dispensing system 300 may include a fluid source 302, a spray system 304, a dispensing nozzle 306 with a dispensing barrel 307 and end 309, a controller 308, a camera 312, a drain pan 316, and a light source 318 similar to those described above with respect to FIG. 1.

The camera 312 and the light source 318 may be oriented along a first axis A. The dispensing nozzle 306 may be correspondingly positioned with respect to the camera 312 such that a fluid pattern 310 dispensed by the dispensing nozzle 306 is also aligned along the first axis A. The fluid dispensing system may include a first polarizing filter 322 located between the light source 318 and the fluid pattern 310 produced by the dispensing nozzle 306. The fluid dispensing system may also include a second polarizing filter 324 located between the fluid pattern 310 produced by the dispensing nozzle 306 and the camera 312. The first polarizing filter 322 and second polarizing filter 324 may be linear polarizers, such as a quarter-wave plate, a half-wave plate, or another type of wave plate.

The fluid in the fluid pattern 310 may polarize light that passes through the fluid in a known direction or manner. For example, the fluid may cause a phase-shift of a quarter-wavelength in light that passes through the fluid. The first polarizing filter 322 and the second polarizing filter 324 may be configured to improve the contrast of the image captured by the camera 312 based on the polarization properties of the fluid.

As light passes through the first polarizing filter 322, the light may become linearly polarized in a particular direction. Some light may continue to travel through fluid pattern 310 and undergo a fixed phase shift, such as by 45° or 90°. The second polarizing filter 324 may be aligned orthogonal to the direction of polarization of the fluid in the fluid pattern 310. This configuration would limit transmission of light that passes through the second polarizing filter except for light that has had its polarization altered by passing through the fluid of the fluid pattern 310. Therefore, the fluid pattern 310 may appear lighter than the background.

Figure 4:
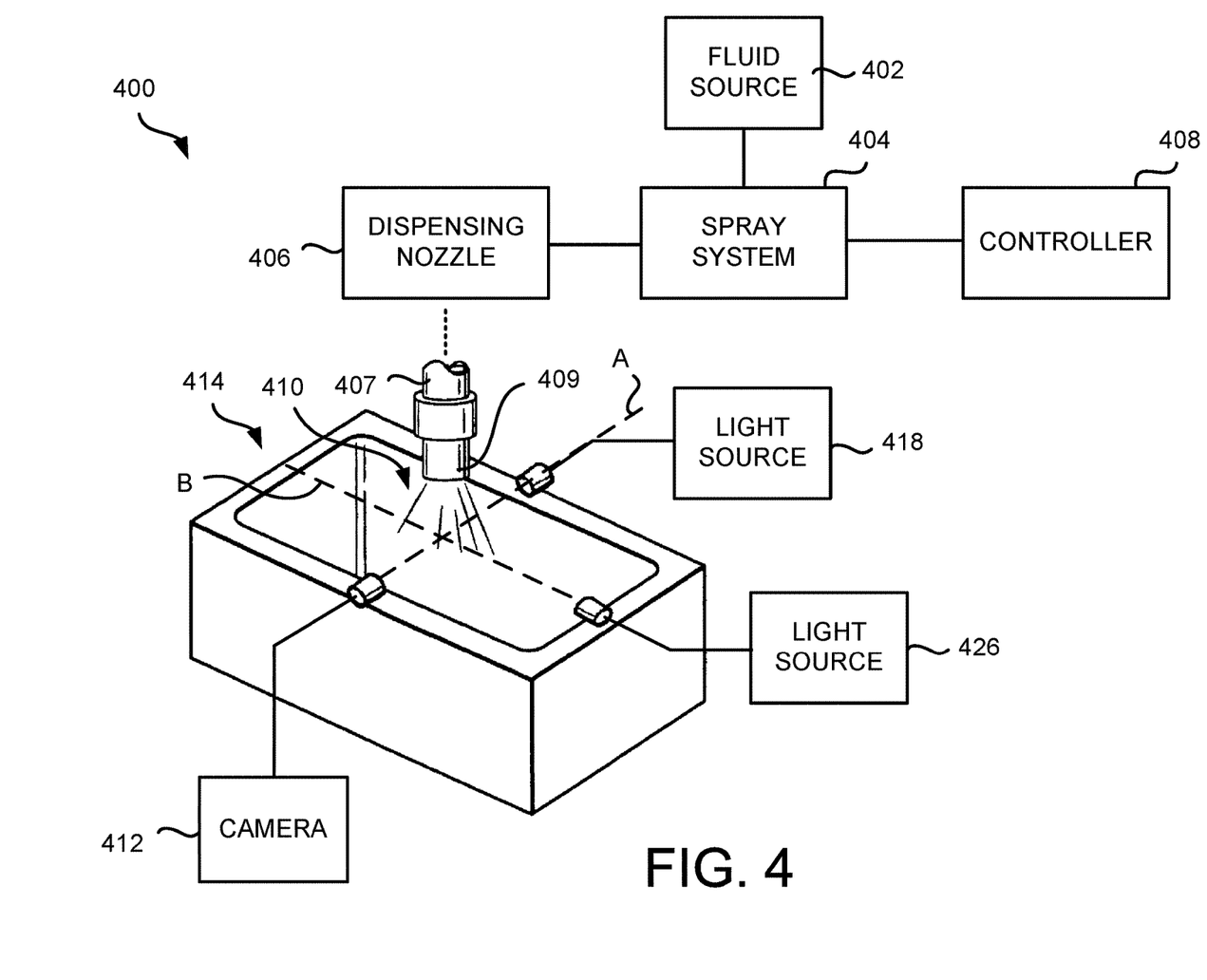
FIG. 4 is a partial schematic diagram of a fluid dispensing system according to yet another aspect of the disclosure.

FIG. 4 illustrates a fluid dispensing system 400 according to yet another aspect. The fluid dispensing system 400 may include a fluid source 402, a spray system 404, a dispensing nozzle 406 with a dispensing barrel 407 and end 409, a controller 408, a camera 412, and a drain pan 416 similar to those described above with respect to FIG. 1. The fluid dispensing system 400 may include a first light source 418 and a second light source 426. The first light source 418 may be located along a first axis A defined by the camera 412 and the a fluid pattern 410 produced by the dispensing nozzle 406. The second light source 426 may be located along a second axis B that intersects with the first axis A at the fluid pattern 410. The second axis B may be perpendicular to or obtuse to the first axis A.

In some aspects, the fluid of the fluid pattern 410 may be dispensed from the dispensing nozzle 406 in a form that may have retroreflective properties. The fluid may reflect light back to its source with a minimum amount of scattering. The retroreflective properties may be a result of the shape of the fluid or surface properties of the fluid. For example, the fluid may be dispensed in as a spray with spherical droplets, which may be retroreflective. A light source located along the same axis as the camera may give higher illumination of the droplets compared to a light source located along a different axis. For example, the first light source 418 may provide more illumination to the fluid pattern 410 compared to the second light source 426 from the perspective of the camera 412.

A difference or ratio in the magnitude of illumination provided by the first light source 418 and the second light source 426 may be indicative of the size, the shape, and/or the quality of atomization of the fluid as it is being dispensed. To distinguish between the first light source 418 and the second light source 426, the first light source 418 may be configured to emit light with a first wavelength, e.g., red, and the second light source 426 may be configured to emit light with a second wavelength different than the first wavelength, e.g., blue. In this example, the retroreflective properties of the fluid may result in the color captured by the camera 412 to have more red light than blue light, which may indicate a higher sphericity of the fluid. If the color captured by the camera 412 appears to have more equal levels of red light and blue light or higher levels of blue light than red light, the controller 408 may determine the sphericity of the fluid is lower.

Although the fluid dispensing systems 100, 200, 300, and 400 mentioned above with reference to FIGS. 1-4 have been described as separate aspects, one or more features of the fluid dispensing systems 100, 200, 300, and 400 may be combined to improve the quality of an image of a fluid pattern captured by a camera 112.

Figure 5:
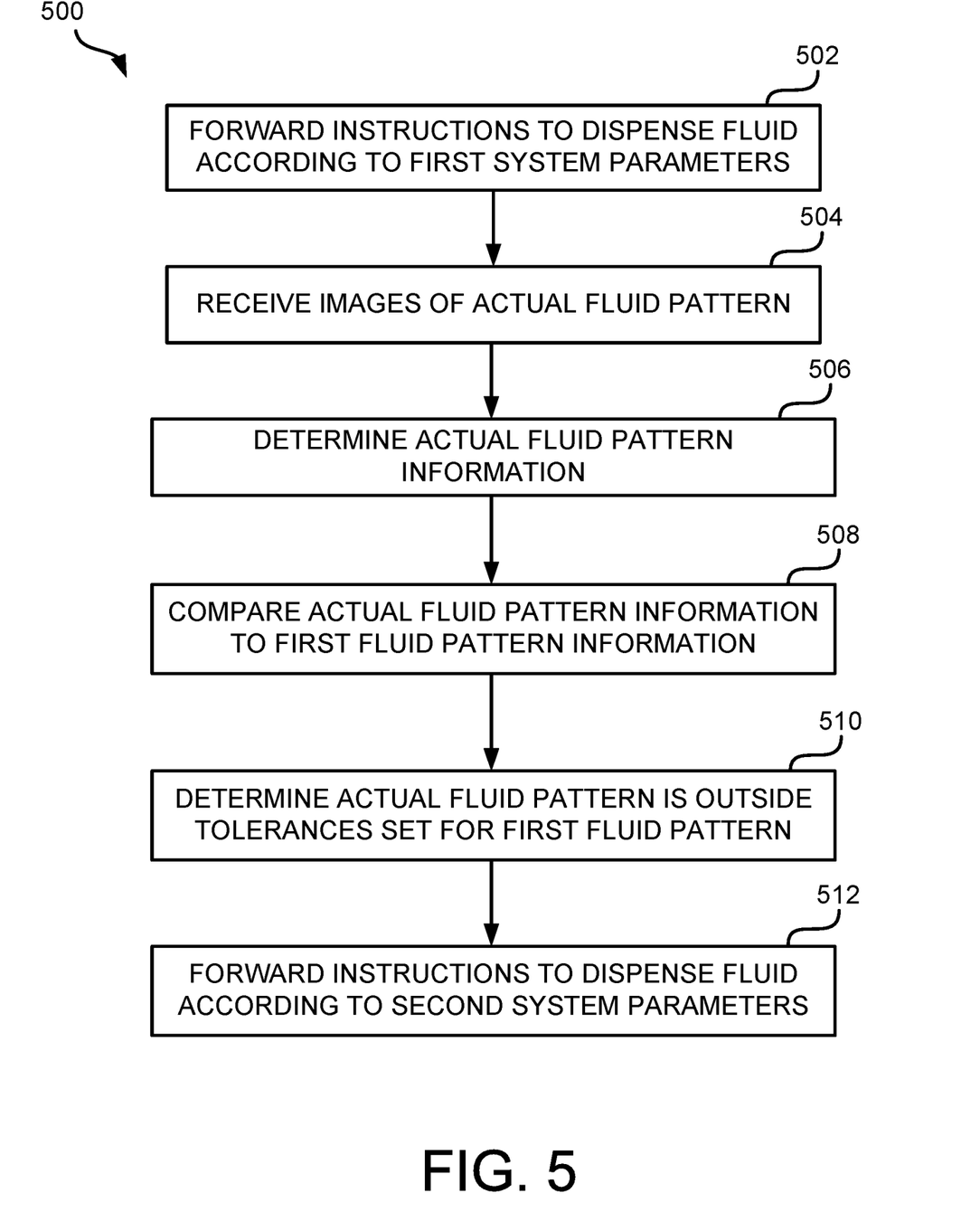
FIG. 5 is a flowchart for a method of controlling a fluid dispensing system according to an aspect of the disclosure.

FIG. 5 illustrates a process 500 for controlling a fluid dispensing system. The process 500 may be executed by the controller 108, 208, 308 or 408. The process 500 starts at step 502. In step 502, the controller 108 may forward instructions to the spray system 104 and/or the dispensing nozzle 106 to dispense the fluid according to one or more first system parameters that are intended to produce a first fluid pattern. The one or more first system parameters may include any parameter relating to the operation of the fluid dispensing system 100, such as a fluid pressure, velocity, and/or volume of the fluid provided to the dispensing nozzle 106, the horizontal and/or vertical position of the dispensing nozzle 106, the rotational orientation of the dispensing nozzle 106, and the pulse timing and/or pulse duration of fluid dispensed from the dispensing nozzle 106. The one or more first system parameters may further include a direction (e.g., horizontal direction) and/or velocity (e.g., horizontal velocity) of movement of the dispensing nozzle 106 relative to the substrate or vice versa. The dispensing nozzle 106 may then dispense the fluid according to the one or more first system parameters. The stream or spray dispensed by the dispensing nozzle 106 may have a first actual fluid pattern, which may or may not match the intended first fluid pattern. In some aspects, the controller 108 may forward instructions as a result of an operator input.

At step 504, images of the stream or spray of the fluid showing the actual fluid pattern are received by the controller 108 from one or more cameras 112. In some aspects, the camera(s) 112 may be continuously capturing and forwarding images of the actual fluid pattern at predetermined time intervals. For example, the controller 108 may receive a video stream of the actual fluid pattern. In other aspects, the controller 108 may forward instructions to the camera(s) 112 to capture images of the stream or spray of the fluid at a particular point in time.

In yet other aspects, the camera(s) 112 may capture one or more images or video streams of the actual fluid pattern from multiple angles. For example, a first camera 112 may capture one or more images or a video stream of the actual fluid pattern from a first angle and a second camera 112 may capture one or more images or a video stream of the actual fluid pattern from a second, different angle. The first angle may be perpendicular to the second angle. As another example, the camera(s) 112 may be configured to move between one or more positions relative to the actual fluid pattern (e.g., rotate partially or fully around the actual fluid pattern) and thereby capture one or more images or a video stream of the actual fluid pattern from multiple angles. The one or more images or video streams depicting the actual fluid pattern from multiple angles may subsequently be provided to and received by the controller 108.

At step 506, the controller 108 may determine first actual fluid pattern information of the first actual fluid pattern. The controller 108 may determine the actual fluid pattern information based on the images received from the camera 112. The actual fluid pattern information may include at least one of a dimension (e.g., a width) of the actual fluid pattern, a shape of the actual fluid pattern, a horizontal or vertical offset of the actual fluid pattern, a density of the actual fluid pattern, a quality of the actual fluid pattern, a size of droplets of the actual fluid pattern, a rotational orientation of the actual fluid pattern, or other characteristic of the actual fluid pattern. An offset of the actual fluid pattern may refer to an offset in position of the actual fluid pattern from a desired alignment. For example, the actual fluid pattern may be centered 2 mm away from a desired location. The controller 108 may determine the actual fluid pattern information based on various image processing algorithms, such as high-pass filtering to determine edges of the actual fluid pattern.

In some aspects, the controller 108 may determine a three-dimensional model of the actual fluid pattern based on the one or more images or video streams of the actual fluid pattern received from the camera 112. The three-dimensional model may be created, for example, using known techniques to recognize boundaries and/or features in each of the images of the actual fluid pattern and triangulating (and/or using other tomographic methods) the recognized boundaries and/or features to create a representation of the actual fluid pattern within the model. As the three-dimensional model provides a representation of the actual fluid pattern, the aforementioned actual fluid pattern information may be determined based on the three-dimensional model.

At step 508, the controller 108 may compare the first actual fluid pattern information to first fluid pattern information for the intended first fluid pattern that corresponds to the one or more first system parameters. That is, the observed first actual fluid pattern information may be compared to the first fluid pattern information that is expected using the one or more first system parameters. The first fluid pattern information may be the same type of information described above with respect to the actual fluid pattern information except as related to the intended first fluid pattern. For example, if the first actual fluid pattern information represents a width of the actual fluid pattern, the width of the actual fluid pattern may be compared to the desired width of the intended first fluid pattern represented in the first fluid pattern information. In some aspects, the controller 108 may calculate a difference between a magnitude of the first actual fluid pattern information and the first fluid pattern information. In other aspects, the controller 108 may calculate a ratio between the first actual fluid pattern information and the first fluid pattern information.

At step 510, the controller 108 may determine, based on the comparison of the first actual fluid pattern information to the first fluid pattern information, that the first actual fluid pattern is outside tolerances set for the first fluid pattern. The tolerances set for the first fluid pattern may include at least one of a desired width of the first fluid pattern, a desired shape of the first fluid pattern, a permissible offset of the first fluid pattern, a desired density of the first fluid pattern, a desired quality of the first fluid pattern, a desired size of droplets of the first fluid pattern, a desired rotational orientation of the first fluid pattern, or other design or process limit for the first fluid pattern. For example, the controller 108 may determine that the width of the first actual fluid pattern at a particular height is greater than a tolerance of the first fluid pattern. In another example, the controller 108 may determine that the sphericity of the droplets in the first actual fluid pattern is lower than a tolerance of the first fluid pattern. The first actual fluid pattern information being outside a tolerance of the first fluid pattern may indicate that one or more system parameters of the fluid dispensing system 100 may need to be adjusted. Based on the actual fluid pattern information and the first fluid pattern information, the controller 108 may determine instructions to change system parameters of the fluid dispensing system 100 to dispense fluid with one or more second system parameters that may be different than the one or more first system parameters. For example, the controller 108 may determine instructions to reduce the fluid pressure at which fluid is provided to the dispensing nozzle 206, which may thereby reduce the width of the fluid pattern, preferably to a width that is within a width tolerance.

At step 512, the controller 108 may forward instructions to the spray system 104 and/or dispensing nozzle 106 to dispense the fluid according to the at least one second system parameters, which may cause the dispensing nozzle 106 to produce a second actual fluid pattern different than the first actual fluid pattern. Like the first system parameter(s), the second system parameters may include any parameter relating to the operation of the fluid dispensing system 100 and may include a fluid pressure, velocity, and/or volume of the fluid provided to the dispensing nozzle 106, the horizontal and/or vertical position of the dispensing nozzle 106, the rotational orientation of the dispensing nozzle 106, and the pulse timing and/or pulse duration of fluid dispensed from the dispensing nozzle 106. In some aspects, the dispensing nozzle 106 and/or substrate may be configured to move in at least one horizontal direction. The second system parameters may be a direction and/or horizontal velocity of the dispensing nozzle 106 and/or substrate. The spray system 104 and/or dispensing nozzle 106 may use the second system parameters and subsequently dispense the fluid according to the second actual fluid pattern that matches closer to the first fluid pattern.

In some aspects, the controller 108 may forward an alert to an operator of the fluid dispensing system 100. The alert may indicate the actual fluid pattern is outside tolerances set for the first fluid pattern. The alert may contain suggested changes to system parameters of the fluid dispensing system 100 and to dispense the fluid according to different system parameters. An operator of the fluid dispensing system 100 may manually adjust system parameters to dispense the fluid with a different actual fluid pattern in step 512.

As used herein, the controller 108, 208, 308, and 408 may be a processor-based device that operates by executing computer-executable instructions read from a non-transitory computer-readable medium. The non-transitory computer-readable medium may be a hard drive, flash drive, RAM, ROM, optical memory, magnetic memory, combinations thereof, or any other machine-readable medium known in the art. The controller 108, 208, 308, and 408 may be single device or a plurality of devices. Further, the controller 108, 208, 308, and 408 may be a dedicated controller or may be implemented within an existing controller also serving one or more other functions, e.g., engine or machine speed control. It will be appreciated that any of the processes or functions described herein may be effected or controlled by the controller 108, 208, 308, and 408.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A fluid dispensing system, comprising:
a source of a fluid;
a dispensing nozzle, and a spray system supplying the fluid from the source of the fluid to the dispensing nozzle using system parameters for the spray system, the spray system and dispensing nozzle being configured to dispense the fluid as a stream or spray as an actual fluid pattern according to one or more first system parameters that are intended to produce a first fluid pattern;
a first light source operatively configured to emit light through a first actual fluid pattern dispensed from the dispensing nozzle, the first light source positioned to face the first actual fluid pattern so as to direct the emitted light through the first actual fluid pattern;
a camera configured to capture one or more images of the first actual fluid pattern dispensed from the dispensing nozzle; and
a controller operatively connected to the spray system and the camera, the controller being configured to:
forward instructions to the spray system to dispense the fluid according to the one or more first system parameters to produce the first actual fluid pattern;
receive the one or more images of the first actual fluid pattern from the camera;
determine, based on the received one or more images, a three-dimensional model of the first actual fluid pattern, and determine first actual fluid pattern information of the first actual fluid pattern based on the three-dimensional model;
compare the first actual fluid pattern information to first fluid pattern information for the first fluid pattern;
determine, based on the comparison of the first actual fluid pattern information to the first fluid pattern information, that the first actual fluid pattern is outside tolerances set for the first fluid pattern; and
forward, based on the determination that the first actual fluid pattern is outside tolerances set for the first fluid pattern, one or more second system parameters to the spray system to produce a second actual fluid pattern.

2. The fluid dispensing system of claim 1, wherein the first light source is operatively coupled to the controller.

3. The fluid dispensing system of claim 1, wherein:
the camera and the first light source are each vertically positioned at different vertical positions; and
the horizontal position of the dispensing nozzle is between the horizontal position of the camera and the horizontal position of the first light source.

4. The fluid dispensing system of claim 1, wherein the camera and the first actual fluid pattern are located along a first axis and the first light source and the first actual fluid pattern are located along a second axis that intersects with the first axis at the first actual fluid pattern.

5. The fluid dispensing system of claim 4, wherein the first axis is perpendicular to the second axis.

6. The fluid dispensing system of claim 4, wherein the first light source comprises a planar laser.

7. The fluid dispensing system of claim 1, wherein the first actual fluid pattern is located between the camera and the first light source, the fluid dispensing system further comprising:
a first polarization filter having a first polarization direction, the first polarization filter positioned between the first actual fluid pattern and the first light source; and
a second polarization filter having a second polarization direction orthogonal to the first polarization direction, the second polarization filter positioned between the first actual fluid pattern and the camera.

8. The fluid dispensing system of claim 1, further comprising:
a second light source operatively coupled to the controller, the second light source configured to emit light through the first actual fluid pattern, wherein:

the first actual fluid pattern, the camera, and the first light source are located along a first axis; and the first actual fluid pattern and the second light source are located along a second axis that intersects with the first axis at the first actual fluid pattern.

9. The fluid dispensing system of claim 8, wherein the first axis is perpendicular to the second axis.

10. The fluid dispensing system of claim 8, wherein the first light source emits light at a first wavelength and the second light source emits light at a second wavelength different than the first wavelength.

11. The fluid dispensing system of claim 1, wherein the first actual fluid pattern information is at least one of a width of the first actual fluid pattern, a shape of the first actual fluid pattern, an offset of the first actual fluid pattern, a density of the first actual fluid pattern, a quality of the first actual fluid pattern, a size of droplets of the first actual fluid pattern, and a rotational orientation of the first actual fluid pattern.

12. The fluid dispensing system of claim 1, wherein the tolerances set for the first fluid pattern is at least one of a desired width of the first fluid pattern, a desired shape of the first fluid pattern, a permissible offset of the first fluid pattern, a desired density of the first fluid pattern, a desired quality of the first fluid pattern, a desired size of droplets of the first fluid pattern, and a desired rotational orientation of the first fluid pattern.

13. The fluid dispensing system of claim 1, wherein the one or more second system parameters comprise at least one of a fluid pressure of the fluid, a volume of the fluid, a velocity of the fluid, a horizontal position of the dispensing nozzle, a vertical position of the dispensing nozzle, a rotational orientation of the dispensing nozzle, a timing between pulses of the dispensing nozzle, and a pulse duration of the dispensing nozzle.

14. The fluid dispensing system of claim 1, wherein:
the dispensing nozzle is further configured to move in at least one horizontal direction, and
the one or more second system parameters comprise a horizontal velocity of the dispensing nozzle.

15. The fluid dispensing system of claim 1, further comprising a second camera operatively connected to the controller, wherein:
the one or more images of the first actual fluid pattern from the camera are from a first angle with respect to the first actual fluid pattern;
the second camera is configured to capture a second set of one or more images of the first actual fluid pattern from a second angle with respect to the first actual fluid pattern, the second angle being different than the first angle; and
the controller is further configured to:
receive the second set of one or more images of the first actual fluid pattern from the second camera; and
determine the three-dimensional model of the first actual fluid pattern based on the one or more images of the first actual fluid pattern from the camera and the second set of one or more images of the first actual fluid pattern from the second camera.

16. The fluid dispensing system of claim 1, wherein the dispensing nozzle is configured to dispense the fluid in a non-atomized form.

17. A fluid dispensing system, comprising:
a source of a fluid;
a dispensing nozzle, and a spray system supplying the fluid from the source of the fluid to the dispensing nozzle using system parameters for the spray system, the spray system and dispensing nozzle being configured to dispense the fluid as a stream or spray as an actual fluid pattern according to one or more first system parameters that are intended to produce a first fluid pattern;
a camera configured to capture one or more images of the first actual fluid pattern dispensed from the dispensing nozzle; and
a controller operatively connected to the spray system and the camera, the controller being configured to:
forward instructions to the spray system to dispense the fluid according to the one or more first system parameters to produce the first actual fluid pattern;
receive the one or more images of the first actual fluid pattern from the camera;
determine, based on the received one or more images, first actual fluid pattern information of the first actual fluid pattern;
compare the first actual fluid pattern information to first fluid pattern information for the first fluid pattern;
determine, based on the comparison of the first actual fluid pattern information to the first fluid pattern information, that the first actual fluid pattern is outside tolerances set for the first fluid pattern;
forward, based on the determination that the first actual fluid pattern is outside tolerances set for the first fluid pattern, one or more second system parameters to the spray system to produce a second actual fluid pattern, wherein:
the one or more images of the first actual fluid pattern comprise at least one image of the first actual fluid pattern from a first angle and at least one image of the first actual fluid pattern from a second angle different than the first angle, and
the controller is further configured to determine a three-dimensional model of the first actual fluid pattern based on the at least one image of the first actual fluid pattern from the first angle and the at least one image of the first actual fluid pattern from the second angle, wherein the first actual fluid pattern information is determined further based on the three-dimensional model of the first actual fluid pattern.

18. The fluid dispensing system of claim 17, wherein the camera is configured to move between a first position to capture the at least one image of the first actual fluid pattern from the first angle and a second position to capture the at least one image of the first actual fluid pattern from the second angle.

19. A method of controlling a fluid dispensing system, the method comprising:
forwarding instructions to a spray system of the fluid dispensing system to dispense a fluid through a dispensing nozzle according to one or more first system parameters intended to produce a first fluid pattern;
emitting light from a first light source that faces a first actual fluid pattern dispensed by the dispensing nozzle so as to direct the emitted light through the first actual fluid pattern;
receiving one or more images of the first actual fluid pattern dispensed by the dispensing nozzle from a camera;
determining, based on the one or more images, a three-dimensional model of the first actual fluid pattern, and determining first actual fluid pattern information of the first actual fluid pattern based on the three-dimensional model;
comparing the first actual fluid pattern information to first fluid pattern information for the first fluid pattern;

determining, based on the comparison of the first actual fluid pattern information to the first fluid pattern information, that the first actual fluid pattern is outside tolerances set for the first fluid pattern; and forwarding, based on the determination that the first actual fluid pattern is outside tolerances set for the first fluid pattern, one or more second system parameters to the spray system to produce a second actual fluid pattern.

20. The method of claim 19, wherein the first actual fluid pattern information is at least one of a width of the first actual fluid pattern, a shape of the first actual fluid pattern, an offset of the first actual fluid pattern, a density of the first actual fluid pattern, a quality of the first actual fluid pattern, a size of droplets of the first actual fluid pattern, and a rotational orientation of the first actual fluid pattern.

21. The method of claim 19, wherein the tolerances set for the first fluid pattern is at least one of a desired width of the first fluid pattern, a desired shape of the first fluid pattern, a permissible offset of the first fluid pattern, a desired density of the first fluid pattern, a desired quality of the first fluid pattern, a desired size of droplets of the first fluid pattern, and a desired rotational orientation of the first fluid pattern.

22. The method of claim 19, wherein the one or more second system parameters comprise at least one of a fluid pressure of the fluid, a volume of the fluid, a velocity of the fluid, a horizontal position of the dispensing nozzle, a vertical position of the dispensing nozzle, a rotational orientation of the dispensing nozzle, a timing between pulses of the dispensing nozzle, and a pulse duration of the dispensing nozzle.

23. The method of claim 19, wherein the dispensing nozzle is configured to move in at least one horizontal direction, and wherein the one or more second system parameters comprise a horizontal velocity of the dispensing nozzle.

24. The method of claim 19, further comprising maintaining a model of the first actual fluid pattern based on at least the one or more images.

25. The method of claim 19, wherein: the one or more images of the first actual fluid pattern comprise at least one image of the first actual fluid pattern from a first angle and at least one image of the first actual fluid pattern from a second angle different than the first angle, wherein the three-dimensional model of the first actual fluid pattern is based on the at least one image of the first actual fluid pattern from the first angle and the at least one image of the first actual fluid pattern from the second angle.

26. The method of claim 19, wherein the dispensing nozzle is configured to dispense the fluid in a non-atomized form.

* * * * *